Figure 3:
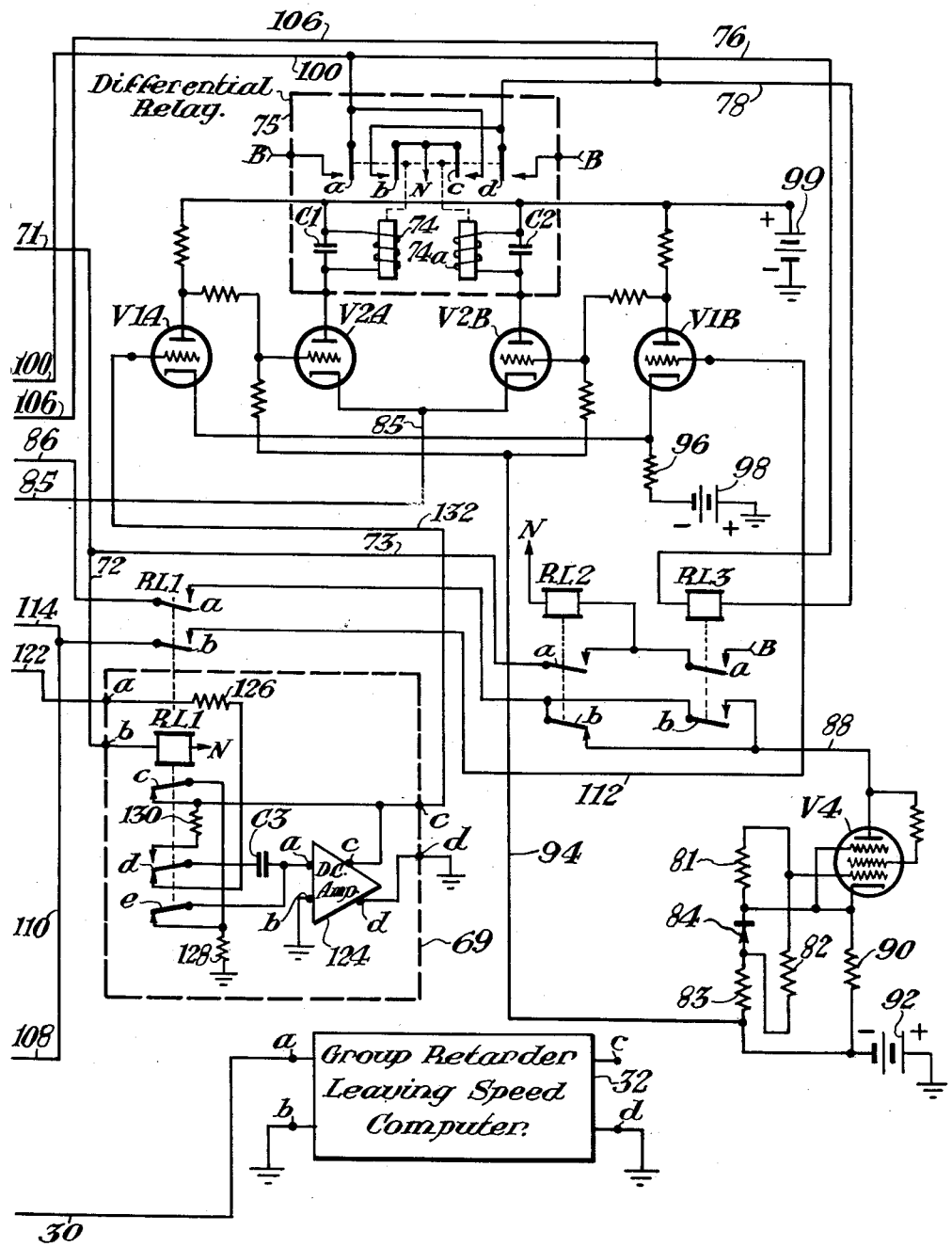

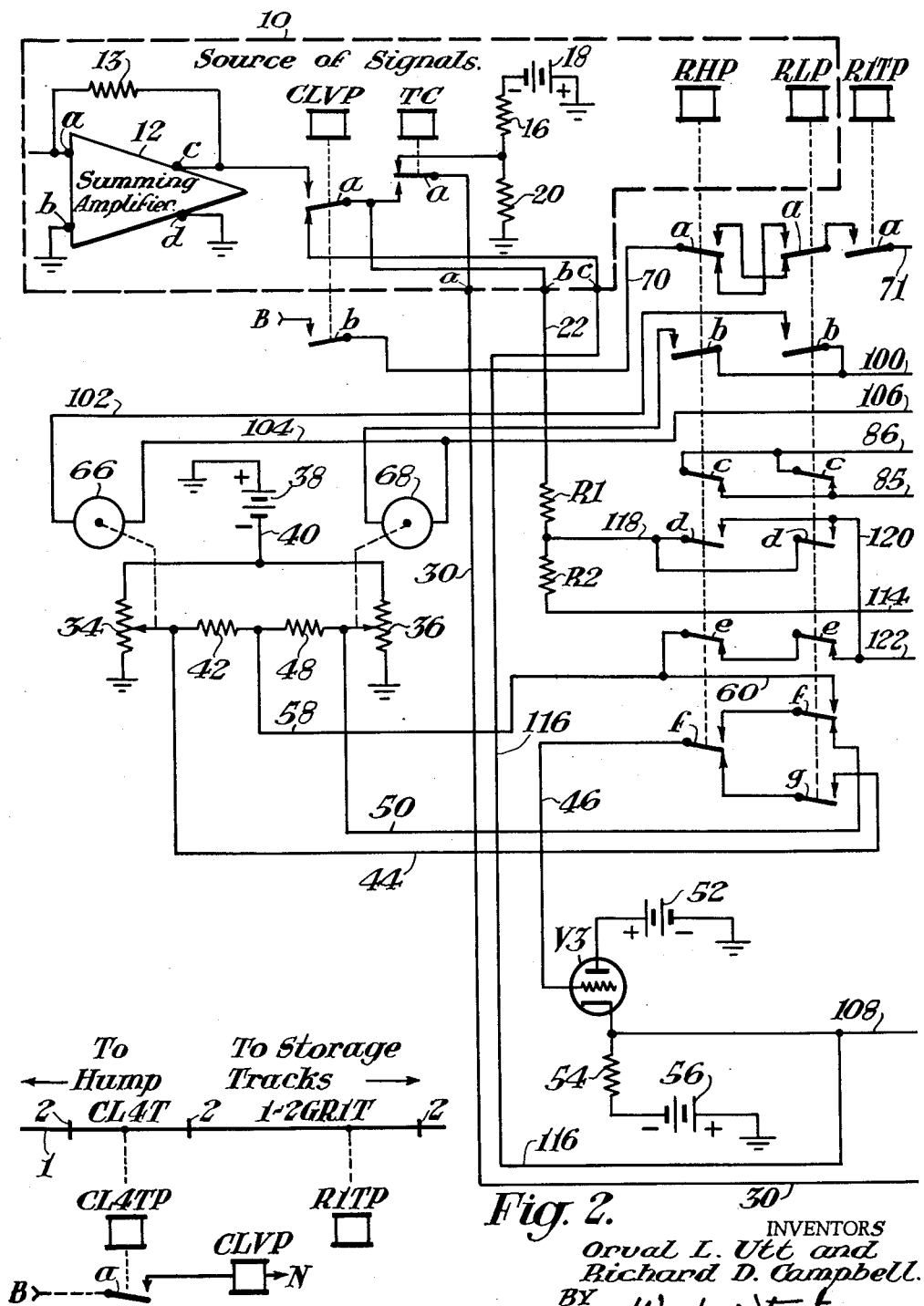

INVENTORS
Orval L. Utt and
Richard D. Campbell.
BY W. L. Stout.
THEIR ATTORNEY

United States Patent Office 2,977,462
Patented Mar. 28, 1961

2,977,462

COMPUTING APPARATUS

Orval L. Utt, Monroeville, and Richard D. Campbell, Harmarville, Pa., assignors to Westinghouse Air Brake Company, Wilmerding, Pa., a corporation of Pennsylvania Filed Mar. 27, 1959, Ser. No. 802,450

13 Claims. (Cl. 246—182)

Our invention relates to computers, and particularly to computing apparatus for deriving and maintaining a running average value of a variable parameter for which measured values are periodically available.

Computing apparatus is frequently provided for controlling a variable parameter in accordance with a plurality of parameters, one or more of which may be continuously measured. It is often necessary to continue the control operation, even though a measured value of one of the parameters may be temporarily unavailable. In such a case, it would be desirable to have available an average value for the variable parameter based on the measurements periodically made. For example, in the art of railway car classification it is desired to direct a cut of one or more cars to a preselected one of a plurality of storage tracks, while at the same time reducing the relatively high initial speed of the cut at the hump to a safe coupling speed with previous cuts occupying the storage track. It is the present practice in railway classification yards to automatically control the speed of each cut by employing car retarders located at selected points along the route that each cut traverses, the braking pressure applied by the retarder depending upon several significant parameters relating to the classification yard and to the cuts being classified. The parameters may include the rolling resistance of each cut which is computed as the cut moves over a predetermined stretch of curved track along its route. Means have been developed for automatically measuring these several parameters and the rolling resistance of each cut, computing from the parameters and the rolling resistance the cut leaving speed from the group retarder, and controlling the retarder in accordance with the computed leaving speed to assure a satisfactory speed at which the cut will become coupled to cuts already standing on a particular storage track. One such system for computing and storing values of rolling resistance for curved track is disclosed and claimed in the copending application for Letters Patent of the United States of Robert W. Mowery, Serial No. 695,337, filed November 8, 1957, for Computing Apparatus, and assigned to the assignee of the present application. In a system of the type shown in the copending application, the rolling resistance of cuts moving over curved track is measured immediately before the cuts enter a group retarder, this measured value being apppplied in conjunction with other measured variable parameters to a computer which determines the exit speed at which the cuts should be released from the group retarder. In some instances, a measured value of curved track rolling resistance can not be obtained for a particular cut, and it is then necessary to provide the computer with a signal proportional to a typical average value of rolling resistance. For example, in a classification yard of the type having a master retarder and one or more group retarders, it may be necessary for the accurate measurement of the rolling resistance of a cut that the cut be shorter than a predetermined length, and that it leave the master retarder at a predetermined speed. To ensure that these conditions are fulfilled before using a measurement, means may be provided for controlling and checking the speeds of cuts leaving the master retarder, and means may be located in the approach to each group retarder for measuring the length of each cut and detecting when the measured length does not fall within predetermined limits of length. When the length of a cut exceeds a predetermined length, or when the cut does not attain a predetermined exit speed when released by the master retarder, a measured value of rolling resistance is not available and a preset average value of curved track rolling resistance must be selected according to the weight of the cut and supplied to the computer.

Computing the exit speed of a cut from a group retarder on the basis of a preset average value has the disadvantage that the selected average value may not accurately reflect weather conditions prevailing in the classification yard. In addition, it may happen in systems providing preset average values of rolling resistance that the available preset values are not corrected frequently enough in accordance with anticipated rolling characteristics of cuts to be classified. Consequently, the selected average value of rolling resistance may not closely enough represent the actual rolling resistance of the cut.

It has been found that the rolling resistance of a cut varies considerably and is affected by variations in temperature, the previous history of the cut, and other factors well known to those skilled in the art. For example, cars that are humped immediately after their arrival in the receiving yard will ordinarily exhibit lower average values of rolling resistance than will cars that have remained in the receiving yard for an appreciable length of time. One erason for this is that the journal bearings of cars that have just arived in the yard are better lubricated than the bearings of cars that have been motionless for some period of time. Accordingly, should it be necessary to utilize in the computer an average value in order to compute the leaving speed from a group retarder of a car associated with a train that has been idle, it is desired that the average value more closely approximate the average value associated with the cars of that particular train; that is to say, successive measured values of rolling resistance of cars in a specific weight class should continuously affect the related average value of rolling resistance.

Accordingly, an object of our invention is to provide a computer which will derive and store signals representing average values of a periodically measured variable parameter.

A more particular object of our invention is to provide means for continuously deriving and storing average values of rolling resistance in terms of repetitive single measured values of rolling resistance of respective ones of a plurality of railway cars.

Another object of our invention is to provide a computer having an output signal which is a function of a plurality of successive input value signals while at the same time preventing any single input value signal from affecting the output signal of the computer to an appreciable extent.

Yet another object of our invention is the provision for a railway classification yard of computing apparatus having an output signal which accurately reflects the existing conditions in the yard and the rolling characteristics of railway cars currently undergoing classification.

Other objects and features of our invention will be in part obvious from the accompanying drawings and in part pointed out as the description proceeds.

In practicing our invention, in accordance wtih one specific embodiment thereof which may be applied to a classification yard of the type having car retarders which automatically retard the movement of cuts being humped, we provide means for receiving a plurality of signals which correspond to measured values of curved track rolling resistance of cuts currently undergoing classification. Additional means are provided for comparing each of these measured values with one of a plurality of stored values of rolling resistance selected in accordance with the axle load of each cut. We provide additional means for automatically adjusting the stored values of rolling resistance to an extent proportional to a predetermined percentage of the difference between the stored value and the incoming measured values of rolling resistance. To provide for the possibility that a cut may not be of measurable length, or may not have left the master retarder at a predetermined leaving speed, we provide means for supplying respective ones of stored values of curved track rolling resistance to suitable speed computing apparatus in order to accurately compute the leaving speed of the cut from a group retarder.

We shall describe in detail one embodiment of our invention, and shall then point out the novel features thereof in claims.

Fig. 1 of the accompanying drawings is a diagrammatic view of a stretch of track in a railway classification yard divided into track sections each provided with conventional track circuit apparatus adapted to cooperate with apparatus embodying our invention.

Figs. 2 and 3, when arranged side by side, comprise a wiring diagram of one embodiment of our invention which is adapted to be operatively connected to the track circuit system shown in Fig. 1.

Referring now to the drawings, we have illustrated one embodiment of our invention which is adapted to be employed as a component of a system disclosed and claimed in the aforesaid copending application of Mowery. Since the details of the overall system do not form a part of our invention, we have illustrated only those parts of the apparatus shown in the copending application which are directly involved in the operation of the illustrated embodiment of our invention, and such parts as are shown are essentially in block diagram form. However, the block diagrams will easily be identified with corresponding portions shown in detail in the copending application referred to.

The relays shown in the drawings may be operated by a conventional 24-volt D.C. power supply, not shown, having positive and negative terminals identified by the conventional reference characters B and N, respectively. Additional D.C. power supplies are provided in Figs. 2 and 3, and are shown by battery symbols referenced to a common potential indicated by the ground symbol and having appropriate positive and negative polarity indications.

In practice, curved track rolling resistance is usually measured in pounds per ton, that is, the frictional force in pounds force opposing the motion of the car per ton of weight supported by the wheels of the car. For convenience, curved track rolling resistance hereinafter may be referred to as $R_c$, and it will be understood that $R_c$ may, in a particular case, be either a stored average value or an actual measured value of rolling resistance.

Referring specifically to Fig. 1, we have shown the apparatus necessary to indicate the moment that a cut of cars reaches a specific point along its route so that the measured value of $R_c$ of the particular cut at this time may be clamped and used to modify a selected stored average value of rolling resistance. The actual adjustment of a selected average value of $R_c$, in response to the receipt of a measured value of $R_c$, will be described as the specification proceeds.

Across the top of Fig. 1, we have shown a short stretch of track 1 which represents a typical route segment in a railway classification yard, this track being shown by a conventional single line representation. The stretch of track includes track sections CL4T and 1–2GR1T which correspond to similarly designated track sections shown in the copending application for Letters Patent of the United States of David P. Fitzsimmons (Deceased) and William A. Robison, Jr., Serial No. 676,730, filed August 7, 1957, for Automatic Control Systems for Railway Classification Yards, this application having the same assignee as the present application. As fully described in that application, section 1–2GR1T may be associated with the first section of a multiple section group retarder, whereas section CL4T is a cut length measuring section adjoining the entrance end of the group retarders. The group retarders in a classification yard may be provided with any desired number of sections, and reference is made to the above-mentioned copending application of Fitzsimmons and Robison for the complete layout of, for example, a two-section group retarder.

Track section CL4T is one of a plurality of track sections which are provided with suitable track circuit apparatus for determining whether or not the length of each cut traversing these sections is greater than a predetermined length. For further explanation regarding the operation and arrangement of the cut length measuring sections, particularly in relation to section CL4T, reference is made to copending application for Letters Patent of the United States, Serial No. 696,406, filed November 14, 1957 by Joseph M. Berill for Cut Length Detector, this copending application having the same assignee as the present application.

In practice, the segment of track shown may be curved, but for reasons of convenience it is shown in the drawing as a straight line. The track sections are limited with insulated joints 2 shown in the conventional manner and, as indicated schematically, are provided with repeater relays CL4TP and R1TP associated with the track sections. The operation, and complete details of the circuits for controlling these relays are shown in the above-mentioned copending application of Fitzsimmons and Robison. It is believed sufficient for the purpose of describing our invention to state that relays CL4TP and R1TP become energized or deenergized as the associated track sections are occupied or unoccupied, respectively.

A repeater relay CLVP shown in Fig. 1 is controlled over a circuit including a normally open front contact $a$ of relay CL4TP and further including control circuits (not shown) represented by a dotted line extending from terminal B of the battery to contact $a$ of relay CL4TP. As fully described in the above mentioned copending application of Fitzsimmons and Robison, relay CLVP becomes energized when the head end of a cut occupies section CL4T, but only if the cut is of a measurable length and has left the master retarder at a preset speed. The control circuits schematically indicated in the energizing circuit of relay CLVP are in turn controlled by apparatus which respectively performs the operations of determining if a cut is too long or has not left the master retarder at the correct leaving speed. Since the details of these circuits for controlling relay CLVP are described in the above-mentioned copending application of Fitzsimmons and Robison, and form no part of our present invention, they are not shown.

We shall now describe in more detail the apparatus and circuit arrangement of our invention by which the modification of an average value of $R_c$ is accomplished. Since the specific embodiment of our invention is especially adapted to be connected in a system of the type shown in the previously mentioned copending application of Mowery, and because some knowledge of the operation of such a system is necessary to understand the operation of the apparatus embodying this specific form of our invention, it will be briefly described herein.

Referring now to Figs. 2 and 3, there is shown a circuit arrangement embodying one form of our invention for modifying average values of $R_c$. In Fig. 2 we have shown a source of signals 10 which may correspond to a curved track rolling resistance computer of the type shown in detail in the above referred to copending application of Mowery. The relays shown in source of signals 10 correspond to similarly designated relays in the Mowery application. Furthermore, the operation of relay CLVP, described in Fig. 1 in connection with the application of Fitzsimmons and Robison, with respect to occupancy of section CL4T and the requirements relating to proper cut length and the correct master retarder exit speed of a cut may be identical to the operation of relay CLVP illustrated in the application of Mowery.

Briefly, source of signals 10 includes a summing amplifier 12 adapted to receive an input between terminal $a$ and ground terminal $b$ and to supply an output between terminal $c$ and ground terminal $d$. A resistance 13 provides a feedback path between terminals $a$ and $c$ of the amplifier. When connected in the manner shown in the Mowery application, the output signal appearing at terminal $c$ of amplifier 12 represents a measured value of curved track rolling resistance of a particular cut.

As completely described in the above-noted application of Mowery, relay TC of source of signals 10 is energized during the standby condition of the apparatus and becomes deenergized when a cut approaching the group retarder occupies track section CL4T. In the standby condition, the computing apparatus of the system as a whole is supplied with simulated input conditions to check whether it is operating properly. For this purpose, source of signals 10 merely provides a single value of rolling resistance. This value is provided by connecting one end of resistor 16 to the negative terminal of a battery 18, and connecting the other end of resistor 16 to one end of resistor 20, which has its other end grounded as shown, thus forming a fixed voltage divider. Accordingly, in the standby condition, the voltage appearing at the junction of resistors 16 and 20 may be applied to output terminal $a$ of source of signals 10 over front contact $a$ of relay TC.

Referring now specifically to relays RHP and RLP of source of signals 10, these relays repeat weight information and correspond to similarly designated relays shown in the above-mentioned copending application of Mowery, as hereinabove described. As set forth in that application, relays RHP and RLP become energized in accordance with the weight of a particular cut when the leading wheels of the cut occupy section CL4T, and it is believed unnecessary to describe herein complete details concerning their operation. Briefly, for light weight cuts weighing between 16 and 32 tons, only relay RLP will become energized; for medium weight cuts weighing between 32 and 50 tons, both relays RHP and RLP will become energized; for heavy weight cuts comprising cuts weighing over 50 tons, only relay RHP will become energized.

It will be assumed in the present case that amplifier 12 provides a voltage at its terminal $c$ that is negative with respect to ground terminal $d$, and that this voltage may vary in magnitude from 0 to $-100$ volts. For purposes of illustration, it will be assumed that an output of $-4$ volts under the above conditions represents 1 lb./ton of curved track rolling resistance. In accordance with the above assumption, the measured value of $R_c$ appearing at terminal $c$ of amplifier 12 may vary from 0 to 25 lb./ton.

Thus, when relay CLVP becomes energized, a signal representing a measured value of $R_c$ of a cut is applied over a circuit extending from terminal $c$ of amplifier 12, front contact $a$ of relay CLVP, thence over a first path including terminal $b$ of the source of signals 10, and lead 22 to one end of a resistor R1, the other end of which is connected to a resistor R2, and from front contact $a$ of relay CLVP over a second path including back contact $a$ of relay TC, terminal $a$ of source of signals 10, and lead 30 to input terminal $a$ of a group retarder leaving speed computer 32, which computer has its other input terminal $b$ grounded, as shown. The output signal of computer 32 appears between output terminal $c$ and ground terminal $d$.

One such means for computing the leaving speed of a cut from a group retarder is disclosed and claimed in copending application Serial No. 676,730, above referred to. For purposes of comparing the present application to application Serial No. 676,730, lead 30 in Figs. 1 and 2 corresponds to lead 772 in Fig. 53 of the copending application Serial No. 676,730. As described in that application, the value of rolling resistance of a cut is one of many factors used to determine the computed release speed of the cut from the group retarder. Since the details of the circuits comprising the group retarder leaving speed computer in application Serial No. 676,730 form no part of our present invention, they are not shown.

Thus, the energized condition of relay CLVP indicates that source of signals 10 supplies a measured value of $R_c$ to the group retarder leaving speed computer, whereas, as will be described, the deenergized condition of relay CLVP directs the apparatus embodying our invention to supply an average value of $R_c$ selected in accordance with the axle load of the cut.

When a particular cut enroute to its assigned storage track enters section CL4T and relay CLVP remains deenergized, either the cut has not left the master retarder at the predetermined leaving speed, or its length has exceeded a predetermined length. In either case, front contact $a$ of relay CLVP remains open and the computed value of $R_c$ of the cut is not supplied to group retarder leaving speed computer 32. It is thus necessary to supply an average value of $R_c$. For this purpose, potentiometers 34 and 36 (Fig. 2) are employed, potentiometer 34 storing a voltage corresponding to an average value of $R_c$ of light weight cuts, and potentiometer 36 storing a voltage corresponding to an average value of $R_c$ of heavy weight cuts. No potentiometer is provided for cuts in the medium weight class, and means for obtaining an average value of $R_c$ for medium weight cuts will be described as the specification proceeds.

The resistive element of potentiometer 34 may have one end connected to the negative terminal of a battery 38 through lead 40, the other end of the resistive element being connected to ground as shown. The wiper of potentiometer 34 is connected to one end of a resistor 42 and is also at times connected to the grid of a cathode follower tube V3 over lead 44, front contact $g$ of relay RLP, back contact $f$ of relay RHP, and lead 46.

Potentiometer 36 may have one end of its resistive element connected to the negative terminal of battery 38 through lead 40, the other end of the resistive element being connected to ground as shown. The wiper of potentiometer 36 is connected to one end of a resistor 48 and is also at times connected to the grid of tube V3 through lead 50, back contact $f$ of relay RLP, front contact $f$ of relay RHP, and lead 46.

Tube V3 operating herein as a cathode follower is utilized because of its high input and low output impedance characteristics to isolate potentiometers 34 and 36 from low impedance load circuits to be described. In conformance with the operating characteristics of a cathode follower, the output voltage appearing at the cathode of tube V3 is in phase with the input voltage appearing at the grid, and is nearly equal in magnitude to the grid signal voltage. Hence, with the stored voltage of potentiometer 34 or potentiometer 36 impressed on the grid of tube V3, substantially the same voltage appears at its cathode. The anode of tube V3 is connected to the positive terminal of a battery 52, while its cathode is connected through a resistor 54 to the negative terminal of a battery 56.

As mentioned previously, we provide no potentiometer for obtaining average values of $R_c$ of medium weight cuts. Instead, the average value of $R_c$ of medium weight cuts is derived from the average value of $R_c$ of heavy weight cuts and the average value of $R_c$ of cuts of the light weight class. To this end, resistors 42 and 48 are connected at their opposite ends, and a circuit may extend from their common junction through leads 58 and 60, front contact $f$ of relay RLP, front contact $f$ of relay RHP, and lead 46 to the grid of tube V3. Resistors 42 and 48 are chosen herein to have an equal value of ohmic resistance, and it can be shown that the voltage appearing at their common junction is equal to one half the sum of the voltage appearing at the wipers of potentiometers 34 and 46; that is, this voltage is derived by taking the mean of the voltages stored in the respective potentiometers 34 and 36. It will be apparent from the above that the average value of $R_c$ of medium weight cuts will vary an extent proportional to the adjustment of the wipers of potentiometers 34 and 36.

During the time that source of signals 10 is supplying a measured value of $R_c$, it is desired to adjust the wiper of a selected one of the potentiometers in order to provide a continuous running average of $R_c$ in the selected potentiometer. For this purpose, servomotors 66 and 68 are employed, the output shaft of servomotors 66 and 68 being drivably connected to the wipers of potentiometers 34 and 36, respectively. The mechanical connection between the output shaft of each servomotor and the wiper of its associated potentiometer is shown conventionally by a dashed line. Preferably, servomotors 66 and 68 are of the type known in the art as reversible motors, in which the direction of rotation of the output shaft depends upon the direction of current flowing through the armature of the motor.

Since the applied voltage of battery 38 is negative, the output voltage of potentiometers 34 and 36 will be negative with respect to ground. We shall assume, therefore, that the potential of battery 38 is such that a voltage of −100 volts is applied across the resistive element of both potentiometers. Accordingly, the wiper of each potentiometer may be adjusted by its associated servomotor to supply any voltage from 0 to −100 volts.

Referring now specifically to Fig. 3, relay RL1 forms a part of an electronic storage unit 69. The structure and operation of storage unit 69 will be described as the specification proceeds. In Figs. 2 and 3, relay RL1 has a first pickup circuit which extends from terminal B of the battery over front contact $b$ of relay CLVP, lead 70, back contact $a$ of relay RHP, front contact $a$ of relay RLP, front contact $a$ of relay R1TP, leads 71 and 72, terminal $b$ of storage unit 69, and through the winding of relay RL1 to terminal N of the battery. Since the control of relay R1TP has previously been described in generally discussing Fig. 1, the control circuit for relay R1TP will not be repeated here.

Relay RL1 has a second pickup circuit which extends from terminal B of the battery over front contact $b$ of relay CLVP, lead 70, front contact $a$ of relay RHP, back contact $a$ of relay RLP, front contact $a$ of relay R1TP, leads 71 and 72, terminal $b$ of storage unit 69, and through the winding of relay RL1 to terminal N of the battery.

As will appear, front contact $a$ of relay RL1 is included in a circuit which prevents adjustment of the wiper of the selected potentiometer until the occupancy of a cut of section 1–2GR1T causing the energization of relay R1TP indicates that the measured value of $R_c$ of the cut at that instant is to be used to determine the extent of adjustment of the selected one of the potentiometers. It will be obvious from the previously described arrangement of the contacts of relays RHP and RLP in the circuits for relay RL1 that relay RL1 will not become energized during classification of a medium weight cut.

In the particular embodiment shown in Fig. 3, relay RL3 is provided with a first pickup circuit which may extend from terminal B of the battery, over contact $a$ controlled by winding 74 of a differential relay 75 to be described, lead 76, the winding of relay RL3, lead 78, and over contact $b$ controlled by winding 74 to terminal N of the battery. Relay RL3 has a second pickup circuit which may extend from terminal B of the battery over contact $d$ controlled by the other winding 74a of the differential relay, lead 78, the winding of relay RL3, lead 76, and contact $c$ controlled by winding 74a to terminal N of the battery. Relay RL2 is energized shortly after the energization of relay RL3 and has a pickup circuit extending from terminal B of the battery over front contact $a$ of relay RL3, and through the winding of relay RL2 to terminal N of the battery.

Relays RL2 and RL3 combine to form a holding circuit for relay RL1 which extends from terminal B of the battery, front contacts $a$ of relays RL3 and RL2, leads 73 and 72, terminal $b$ of storage unit 69, and through the winding of relay RL1 to terminal N of the battery. The holding circuit is effective to hold relay RL1 energized although the rear of a cut has vacated section CL4T.

In the specific embodiment herein described, as shown in Fig. 3, triode tubes V2A and V2B are connected in a circuit for comparing the voltages appearing at their respective grids. These tubes have their cathodes commonly connected and, as shown, comprise a differential amplifier well known in the art wherein each tube acts as a cathode follower driving the cathode of the other tube. In accordance with the operating characteristics of a differential amplifier, the output voltages appearing at the anodes of the two halves of the amplifier are substantially equal when the amplifier is in its balanced condition. However, it is possible by applying input voltages of different amplitudes to the grids of tubes V2A and V2B to obtain at certain times a signal between their anodes which is proportional to the difference between the input voltages.

Cathode resistance for the differential amplifier is provided by the plate resistance of a pentode tube V4 connected to the cathodes of tubes V2A and V2B over a circuit to be described. Referring specifically to tube V4, resistors 81, 82, and 83, and a zener diode 84 comprise a circuit well known in the art for producing a nearly constant bias voltage for tube V4. In accordance with the operating characteristics of a pentode when the bias voltage of the tube is constant, the anode current of tube V4 is practically constant and almost independent of changes of anode potential. The constant current is necessary so that tubes V2A and V2B behave similarly at all voltage levels of their input voltages since, as was explained hereinabove, the voltages representing average and measured values of $R_c$ may have any value between 0 and −100 volts.

For light weight cuts, the cathodes of tubes V2A and V2B may be connected to the anode of tube V4 over a circuit including lead 85, back contact $c$ of relay RHP, lead 86, front contact $a$ of relay RL1, back contact $b$ of relay RL2, and lead 88. The cathode of pentode V4 is connected to one end of a resistor 90. The other end of resistor 90 is connected to the negative terminal of a battery 92, which has its positive terminal grounded, as shown.

For heavy weight cuts, the cathode of the differential amplifier comprising tubes V2A and V2B may be connected to the anode of tube V4 through lead 85, back contact $c$ of relay RLP, lead 86, front contact $a$ of relay RL1, back contact $b$ of relay RL2, and lead 88. It will be obvious from the arrangement of the contacts of relays RHP and RLP that during classification of a medium weight cut, the cathode circuit of tubes V2A and V2B will be interrupted. Furthermore, it should be noted that the total cathode current of the differential amplifier is substantially equal to the anode current of tube V4.

The grids of tubes V2A and V2B of the differential amplifier are connected to the anodes of tubes V1A and V1B, respectively, and are connected through suitable resistors and lead 94 to the negative terminal of battery 92. The cathodes of tubes V1A and V1B are directly connected, and are in turn connected through a resistor 96 to the negative terminal of a battery 98. The anodes of tubes V1A and V1B are connected to one end of suitable voltage dropping resistors, the other ends of which are connected to the positive terminal of a battery 99 having the negative terminal grounded, as shown.

The anode of tube V2A is connected to the positive terminal of battery 99 through winding 74 of differential relay 75. Similarly, the anode of tube V2B is connected to the positive terminal of battery 99 through winding 74a of differential relay 75. The armature of differential relay 75 is common to contacts a, b, c, and d and is normally in its neutral position wherein the contacts are in their open positions. When relay 75 is operated, the winding through which the greater current is initially flowing will operate to close a pair of contacts whereas the other pair of contacts will remain open. For instance, if winding 74 initially becomes energized to a greater degree than winding 74a, contacts a and b of relay 75 move to their closed positions whereas contacts c and d remain in their open positions. Conversely, if winding 74a initially becomes energized to a greater degree than winding 74, contacts c and d move to their closed positions whereas contacts a and b remain in their open positions.

Differential relays are well known in the art, and operate on the flux neutralizing principle; that is, when equal currents flow through windings 74 and 74a, the flux in one winding tends to neutralize the flux in the other winding allowing the contacts to occupy their open positions, as shown. However, when the currents flowing through the windings are substantially unequal, the contacts controlled by the winding through which the greater current is flowing will be moved to their closed positions and held there until substantially equal currents again are established through the windings. Capacitors C1 and C2 are connected across windings 74 and 74a of the differential relay to remove the effect of undesirable switching transients.

By way of illustration, if the input voltage initially appearing at the grid of tube V2A is greater than the input voltage initially appearing at the grid of tube V2B, and if the cathode circuit of tubes V2A and V2B is completed, the conduction of tube V2A will increase over the conduction of tube V2B. As previously mentioned, the total cathode current of the differential amplifier is substantially constant. The increased conduction of tube V2A causes conduction of tube V2B to decrease, and the overall effect will be that winding 74 becomes energized to create a greater flux than that caused by the current through winding 74a. Similarly, when the input voltage initially appearing at the grid of tube V2B is greater than the input voltage appearing at the grid of tube V2A, winding 74a will become energized to create a flux which is greater than that caused by the current through winding 74. In either case, when the anode currents through tubes V2A and V2B are nearly equal, or, if the cathode circuit for tubes V2A and V2B is interrupted, the armature of relay 75 assumes its neutral position.

Thus, for light weight cuts, and assuming that winding 74 becomes energized, the armature of servomotor 66 will be connected across the terminals of a 24-volt battery over a circuit extending from terminal B of the battery, contact a controlled by winding 74, lead 100, front contact b of relay RLP, lead 102, the armature of servomotor 66, leads 104 and 106, and contact b controlled by winding 74 to terminal N of the battery.

For light weight cuts, and assuming that winding 74a becomes energized, the armature of servomotor 66 will be connected across the battery through a circuit extending from terminal B of the battery, contact d controlled by winding 74a, leads 106 and 104, the armature of servomotor 66 in a reverse direction with respect to the above-traced path just described, lead 102, front contact B of relay RLP, lead 100, and contact c controlled by winding 74a to terminal N of the battery.

It can thus be seen that servomotor 66 may position the wiper of potentiometer 34 to either increase or decrease the output voltage appearing at the wiper thereof with respect to ground. The voltage level at the wiper of potentiometer 34 may therefore by adjusted to a greater or lesser value in accordance with the direction of the current flowing through the armature of servomotor 66.

In a similar manner, servomotor 68 may operate to increase or decrease the output voltage appearing at the wiper of potentiometer 36 in response to measured values of $R_c$ of heavy weight cuts. It is believed sufficiently clear from the above description and the drawings that the energizing circuits for servomotor 68 may extend over the above-traced circuits for servomotor 66, but will instead include front contact b of relay RHP.

Referring now to the aforementioned operating characteristics of tube V3, it will be recalled that substantially the same value of voltage appearing at the wiper of the selected potentiometer appears at the cathode of tube V3. The voltage appearing at the cathode of tube V3 is applied to the grid of tube V1B over a circuit which may extend through leads 108 and 110, front contact b of relay RL1, and lead 112. The signal appearing at the anode of tube V1B is in turn applied to the grid of tube V2B. Thus, the signal applied to the grid of tube V2B is proportional to a selected average value of $R_c$.

The voltage appearing at the cathode of amplifier V3 is connected by a second path including leads 108, 110, and 114 to the other end of resistor R2. Resistor R2 is chosen, in accordance with a preferred embodiment of our invention, to be approximately eleven percent of the sum of resistors R1 and R2. This value of approximately eleven percent is not an arbitrary selection, but one which in itself has certain advantages, as will hereinafter appear.

The average value of $R_c$, as represented by the cathode voltage of tube V3, is connected by a third path including leads 108 and 116, terminal c of source of signals 10, back contacts a, respectively, of relays CLVP and TC, terminal a of source of signals 10, and lead 30 to input terminal a of group retarder leaving speed computer 32. In summarizing, relay CLVP is energized when measured values of $R_c$ are supplied to group retarder leaving speed computer 32, and the voltage representing an average value of $R_c$ and appearing at the cathode of tube V3 is then interrupted at back contact a of relay CLVP. When it is desired to supply an average value of $R_c$, relay CLVP remains deenergized and relay TC becomes deenergized as the cut occupies section CL4T. The cathode voltage of tube V3 is then applied to terminal a of group retarder leaving speed computer 32 over the above-traced circuit including respective back contacts a of relays CLVP and TC. Further, with the apparatus of our invention in a standby condition, relay TC becomes energized to supply the aforementioned test voltage over its front contact a. With such an arrangement, it will be seen that a measured value of $R_c$ is supplied when relay CLVP becomes energized; an average value of $R_c$ is supplied when relay CLVP remains deenergized; and, in the test compute cycle, a typical test value is supplied over front contact a of relay TC.

Before describing the illustrated embodiment of our invention in further detail, an expression for the voltage that appears at the common junction of resistors R1 and R2 will be derived, this voltage hereinafter being referred to as $E_d$. Resistors R1 and R2, as arranged herein, comprise a summing network essentially of the type shown in Fig. 1c, page 11, of Korn and Korn, Electronic Analog Computers, McGraw-Hill Book Company, Inc., New York, 1952.

As previously indicated, one end of resistor R1 is connected to amplifier 12 of source of signals 10 over the above-traced circuit including front contact $a$ of relay CLVP. It will be recalled that the voltage appearing at terminal $c$ of amplifier 12 is negative with respect to ground and represents a measured or actual value of $R_c$ of a particular cut. In the derivation, for convenience, this voltage is referred to as $E_m$. Also, as hereinabove described, the voltage appearing at the cathode of tube V3 is connected to one end of resistance R2 over the above-traced circuit including leads 108, 110 and 114 and is representative of a selected average value of $R_c$. For convenience in the derivation, the selected average value of $R_c$ will hereinafter be referred to as $E_s$. In view of the above, an equation for voltage $E_d$ may now be written which embraces the voltages $E_s$, $E_m$, and the voltages appearing across resistors R1 and R2.

The equation, expressed in terms of voltages is:

$$E_d = E_s + \frac{R2}{R1+R2} \cdot (E_m - E_s)$$

where the factor $$\frac{R2}{R1+R2}$$

is equal to 0.11, as indicated hereinabove.

The voltage $E_d$ in the above equation represents a value of rolling resistance that differs from the value of $R_c$ presently stored in the selected one of potentiometers 34 and 36 by an amount equal to eleven percent of the difference between the measured value of $R_c$ of a particular cut and the value of $R_c$ stored in the selected potentiometer. It is pointed out that when the measured value of $R_c$ of a cut is greater than the value of $R_c$ stored in the selected potentiometer, the right-hand side of the equation will be equal to a value of $R_c$ which is greater than the stored value of $R_c$. And, when the measured value of $R_c$ of a cut is less than the value of $R_c$ stored in the selected potentiometer, the right-hand side of the equation will be less than the value $R_c$ in the selected potentiometer. Accordingly, it is desired in either case to reset the wiper of the selected potentiometer to the value of the voltage $E_d$.

In order for the selected potentiometer of be reset to a value represented by the voltage $E_d$, this voltage must temporarily be stored. Accordingly, for light weight cuts, a circuit may extend from the common junction of resistors R1 and R2 through lead 118, front contact $d$ of relay RLP, and leads 120 and 122 to terminal $a$ of electronic storage unit 69. For heavy weight cuts, a circuit may extend from the junction of resistors R1 and R2 through lead 118, front contact $d$ of relay RHP, and leads 120 and 122 to terminal $a$ of storage unit 69. For medium weight cuts, the circuit connecting terminal $a$ of storage unit 69 to the common connection of resistors R1 and R2 will obviously extend over both of the above-traced circuits since both relays RHP and RLP will be energized. However, as will appear, no adjustment of potentiometers 34 and 36 takes place in response to measured values of $R_c$ of cuts in the medium weight class.

The electronic storage unit 69 may be one of the devices well known in the art for storing a voltage intended for use at a later time. One such device for this purpose is disclosed and claimed in the copending application for Letters Patent of the United States of James A. Cook, Jr., Serial No. 634,000, filed January 14, 1957, for Electronic Storage Device, now U.S. Patent No. 2,914,- 750, issued November 24, 1959 and assigned to the assignee of the present application. Since the full details of the circuits comprising the electronic storage device of the Cook patent form no part of our present invention, they are not shown, and only a brief description of the operation of the storage device will be given.

In the present application, relay RL1 of storage unit 69 corresponds to relay 4 shown in the patent to Cook. In the present application, storage unit 69 comprises a D.C. amplifier 124 having an input between terminal $a$ and grounded terminal $b$ and an output between terminal $c$ and grounded terminal $d$. As described in the Cook patent, now U.S. Letters Patent No. 2,914,750 granted Nov. 24, 1959, the input voltage to be stored is applied to terminal $a$ of storage unit 69, and thence through a resistor 126, back contact $d$ of relay RL1, a capacitor C3, back contact $e$ of relay RL1, and through a resistor 128 to ground. Relay RL1 is normally deenergized, as shown, and output terminal $c$ of amplifier 124 is connected through back contacts $c$ and $e$ of relay RL1 to provide a first feedback path for amplifier 124. Resistor 128 is thus connected in shunt with the input and output circuits of amplifier 124. The voltage appearing at terminal $c$ of amplifier 124 therefore appears across resistor 128. With relay RL1 deenergized, capacitor C3 charges through resistors 126 and 128 in series, and the time constant is chosen to allow capacitor C3 to charge rapidly. The polarity of the voltage appearing at terminal $c$ of amplifier 124 with respect to ground may be opposite to or the same as the polarity of the voltage applied to terminal $a$ of storage unit 69 with respect to the same voltage reference. If the voltages are opposite to each other in polarity, capacitor C3 will be charged to a voltage approximately equal to the difference between the applied voltage and the voltage appearing at terminal $c$ of the amplifier. If the voltages are of the same polarity, capacitor C3 will be charged to a voltage equal to the sum of the applied voltage and the voltage appearing at terminal $c$ of the amplifier. In either event, capacitor C3 is charged to a voltage which differs from the applied voltage by the voltage existing across resistance 128.

When relay RL1 becomes energized, the circuit for charging capacitor C3 is broken at open back contacts $d$ and $e$ of relay RL1. Also, the connection between input and output terminals of amplifier 124 is broken at open back contact $c$ of relay RL1. Front contact $d$ of relay RL1 now closes to connect capacitor C3 in series with a resistor 130, thereby forming a second feedback path between the input and output terminals of amplifier 124. Consequently, the output voltage appearing at terminal $c$ of amplifier 124 will be substantially equal to the value of the applied voltage which it is desired to store. A high value is chosen for resistor 130 so that capacitor C3 retains its charge for a relatively long period of time.

As previously mentioned, with back contacts $d$ and $e$ of relay RL1 open, the response by capacitor C3 to a voltage $E_d$ appearing at terminal $a$ of storage unit 69 is terminated. That is, as the head end of a particular cut moves over section CL4T, the rolling resistance of the cut is continually computed and, with relay CLVP energized, a signal proportional to the rolling resistance is applied over the above-traced circuit including front contact $a$ of relay CLVP and terminal $b$ of source of signals 10 to one end of resistor R1, thereby producing at the junction of resistors R1 and R2 in a manner previously described a corresponding signal $E_d$ which is simultaneously applied to terminal $a$ of storage unit 69. However, the leading wheels of the particular cut eventually occupy section 1–2GR1T to cause the energization of relay R1TP, and the subsequent energization of relay RL1. Therefore, prior to the energization of relay RL1, capacitor C3 will be charged during the time the leading wheels of the particular cut pass from the entrance end to the exit end, of section CL4T. It follows, therefore, that the ultimate response of capacitor C3 is in effect determined as a function of a final measured value of rolling resistance of the particular cut computed just prior to the instant of entrance by the leading wheels of the cut into section 1–2GR1T.

To improve the transient response of capacitor C3 of storage unit 69, the voltage representing the present average value of $R_c$ of medium weight cuts is applied to input terminal *a* of storage unit 69 during the standby condition of the apparatus. A circuit for applying this voltage to capacitor C3 extends from the junction of resistors 42 and 48, over lead 58, back contacts *e* of relays RHP and RLP, lead 122 to input terminal *a* of the storage unit, and back contact *d* of relay RL1. Capacitor C3 will, therefore, respond to this voltage during the standby condition and build up an initial charge. It will be noted that regardless of the weight classification of a cut the above-traced circuit including contacts *e* of relays RHP and RLP will be opened. Subsequently, when a voltage $E_d$ which it is desired to store is applied to terminal *a* of storage unit 69 over the circuit including contacts *d* of relays RHP and RLP, the charge on capacitor C3 will increase or decrease a slight amount, depending on whether the voltage $E_d$ is greater than or less than the voltage presently representing an average value of $R_c$ of cuts of the medium weight class. Capacitor C3 will, therefore, rapidly charge or discharge to a new level of voltage.

With relay RL1 in its energized condition, the voltage appearing at terminal *c* of storage unit 69 is applied to the grid of tube V1A over a circuit including lead 132. The anode signal of tube V1A is in turn applied to the grid of tube V2A. At the same time, the closing of front contact *b* of relay RL1 connects the cathode of tube V3 to the grid of tube V1B, the signal appearing at the anode of tube V1B being applied to the grid of tube V2B. Thus, a signal which represents a selected average value of $R_c$ appears at the grid of tube V2B, and, at the same time, a signal proportional to this same average value of $R_c$, plus a predetermined percentage of the difference between the average value and the measured value of $R_c$ of a particular cut appears at the grid of tube V2A. Adjustment of the wiper voltage of the selected one of the potentiometers in accordance with the difference between these two signals will now be described.

In order to illustrate the operation of the present embodiment of our invention, a numerical example will be given. It shall first be assumed that the axle load of a cut approaching a group retarder along its route is 20 tons, which would be classified as a light weight cut, and that the cut meets the aforesaid requirements concerning its master retarder leaving speed and its length. Under the above conditions, it will be recalled that relays CLVP and RLP become energized when the cut occupies track section CL4T. For simplicity, it shall next be assumed that the measured curved track rolling resistance of the cut is 12 lb./ton. In view of the previous assumption, the voltage appearing at terminal *c* of summing amplifier 12 of source of signals 10 will have a magnitude of −48 v. Also, when the leading wheels of the corresponding cut occupy section CL4T, relay TC becomes deenergized, thereby completing a path to terminal *a* of group retarder leaving speed computer 32 over the above-traced circuit including front contact *a* of relay CLVP, back contact *a* of relay TC, terminal *a* of source of signals 10, and lead 30. The group retarder leaving speed computer will now utilize the measured value of $R_c$ of the corresponding cut and operate to compute a leaving speed from the group retarder in the manner described in the aforementioned copending application of Fitzsimmons and Robison.

Since a principal object of our invention is to provide a running average value of rolling resistance for cuts in each weight class for use by group retarder leaving speed computer 32 whenever a measured value for cuts can not be obtained, potentiometer 34 is selected for adjustment of the voltage appearing at its wiper. It will next be assumed that the present value of rolling resistance stored in potentiometer 34 is 8 lb./ton. In accordance with the above assumption, potentiometer 34 will be set with its wiper 32/100 of the total resistance value above ground, so that its output voltage is −32 v.

With relay CLVP energized, the voltage appearing at terminal *c* of amplifier 12 is applied to one end of resistor R1 over the above-traced circuit including front contact *a* of relay CLVP, terminal *b* of source of signals 10, and lead 22. With relay RLP energized, the voltage appearing at the wiper of potentiometer 34 is applied to one end of resistance R2 over the above-traced circuit including lead 44, back contact *g* of relay RLP, back contact *f* of relay RHP, lead 46 of the grid of tube V3, and thence from the cathode of tube V3 over leads 108, 110 and 114. From the assumed values of voltage for $E_m$ and $E_s$, and from calculations made with regard to the above equation, the voltage $E_d$ appearing at the junction of resistors R1 and R2 will have a magnitude of approximately −33.76 volts. This voltage is applied to input terminal *a* of storage unit 69 over the previously traced circuit including front contact *d* of relay RLP.

When the front portion of the corresponding cut reaches track section 1–2GR1T, relay R1TP becomes energized and picks up its front contact *a* to complete the previously traced energizing circuit for relay RL1 which includes front contact *a* of relay RLP. With relay RL1 in its energized condition, the cathode circuit for tubes V2A and V2B comprising the differential amplifier is completed over the previously traced circuit including back contact *c* of relay RHP, front contact *a* of relay RL1, and back contact *b* of relay RL2. Also, the voltage $E_s$ appearing at the cathode of tube V3 is applied to the grid of tube V1B over the previously traced circuit which includes front contact *b* of relay RL1. A signal proportional to the value of the voltage $E_s$ is thus applied to the grid of tube V2B. At substantially the same time, the voltage $E_d$ stored in storage unit 69 is now applied to the grid of tube V1A independently of any voltage applied to terminal *a* of storage unit 69 over the previously traced circuit including front contact *d* of relay RL1. Consequently, the signal appearing at the anode of tube V1A and representative of the voltage $E_d$ is now applied to the grid of tube V2A.

With the inputs to tubes V1A and V1B just described, the grid voltage of tube V2A will be more positive in polarity than the voltage appearing at the grid of tube V2B. Tube V2A, therefore, acts as a cathode follower driving the cathode of tube V2B such that the conduction of tube V2B is reduced. However, at the same time, the decreased conduction of tube V2B is accompanied by increased conduction in tube V2A with the result that winding 74 in the anode circuit of tube V2A becomes energized to a greater extent than winding 74a.

With winding 74 thus energized, the above-traced circuit for relay RL3 including contacts *a* and *b* of relay 75 is now completed. Relay RL3, therefore, becomes energized. With relay RL3 energized, contact *b* of relay RL3 closes to shunt back contact *b* of relay RL2, thereby preparing a circuit for the cathodes of tubes V2A and V2B which is completed when relay RL2 is subsequently picked up. When front contact *a* of relay RL3 closes, the obvious energizing circuit for relay RL2 is completed. With relays RL2 and RL3 now energized, the previously traced holding circuit for relay RL1 including contacts *a* of these relays is completed. Relay RL1 is thus retained energized over its holding circuit, and the output signal of storage unit 69 is now continuously applied to the grid of tube V1B.

With relay RLP and winding 74 energized, the previously traced circuit for servomotor 66 including contacts *a* and *b* of relay 75 and front contact *b* of relay RLP is now completed. Accordingly, servomotor 66 will become energized. It will be apparent that since the assumed value of $E_m$ is greater than the assumed value of $E_s$, it is desired to permit the value of $R_c$ stored in potentiometer 34 to follow the measured value of $R_c$. Accordingly, in the present example, it will be understood that servomotor 66 is connected in the circuit in such a manner to increase the voltage appearing at the wiper of potentiometer 34 and thereby cause a corresponding increase of the voltage appearing at the grid of tube V1B. Furthermore, it will be seen that the strength of the signal appearing at the grid of tube V2B is dependent upon the extent of wiper adjustment. The conduction of tube V2B therefore increases in response to adjustment of the wiper of potentiometer 34. Since the total current flowing in the cathode circuit of tubes V2A and V2B is substantially constant, it follows that less current will now flow through tube V2A and winding 74. However, the holding flux established by winding 74 is sufficient to maintain contacts $a$ and $b$ of relay 75 in their closed positions until such time that the respective currents flowing through windings 74 and 74$a$ are nearly equal. Upon further adjustment of the wiper of potentiometer 34, the magnetic flux in windings 74 and 74$a$ will become equalized, thereby causing contacts $a$ and $b$ of relay 75 to return to their open positions. Servomotor 66 and relay RL3 will, therefore, become deenergized, and the wiper of potentiometer 34 will now be set to a new position above ground substantially equal to $33.76/100$ of the total resistance of the potentiometer, an increase in a negative direction of 1.76 volts above the voltage originally appearing at the wiper. In other words, this increase represents a value of rolling resistance proportional to the difference of the signals applied to the grids of tubes V2A and V2B.

With relay RL3 deenergized, the opening of its back contact $a$ interrupts the above-traced energizing circuit for relay RL2 while, at the same time, interrupting the previously traced holding circuit for relay RL1. Relay RL2 upon becoming deenergized further interrupts the holding circuit for relay RL1 at its own front contact $a$. When the rear of the corresponding cut has cleared track section CL4T, causing relays CL4TP, CLVP and relay RLP to become deenergized, the pickup circuit for relay RL1 is interrupted at front contact $a$ of relay CLVP, and further interrupted at front contact $a$ of relay RLP. With its energizing and holding circuits both interrupted, relay RL1 will become deenergized, thus closing its back contacts $d$ and $e$ to thereby place storage unit 69 in a condition for being responsive to a signal $E_d$ to be stored as determined by the rolling resistance of a following cut.

Tubes V2A and V2B may each operate as high gain amplifiers as the signals appearing at their respective grids approach the point where they are practically equal in magnitude. It will be understood, of course, from the particular arrangement of the apparatus embodying our invention, that in essence, the difference of the voltages appearing at the grids of tubes V2A and V2B is amplified as the wiper of the selected potentiometer is continuously adjusted. Amplifying the difference between the signals appearing at the grids of tubes V2A and V2B improves the sensitivity of the apparatus, in that adjustment of the wiper of the selected potentiometer is accomplished until practically no difference between these signals exists.

It will next be assumed that the cut leaves the master retarder at some other than the predetermined speed, or that its length is greater than a predetermined length. It will thus be necessary to supply an average value of $R_c$ to group retarder leaving speed computer 32.

Under the just mentioned conditions, relay CLVP remains deenergized, and, as in the preceding example, relay TC will become deenergized to release its contact $a$ when the cut occupies track section CL4T. It shall be assumed, as in the preceding example, that the cut is in the light weight class, for example, 20 tons average weight. Relay RLP will, therefore, become energized when the cut occupies section CL4T. Also, with relay CLVP deenergized, the previously traced circuit for relay RL1 including front contact $b$ of relay CLVP is not completed. Accordingly, relay RL1 does not become energized. Consequently, the cathode circuits of tubes V2A and V2B of the differential amplifier will remain interrupted, at open front contact $b$ of relay RL1. It is believed clear that with the cathode circuit for tubes V2A and V2B interrupted, the wiper of potentiometer 34 will not be adjusted.

With relay RLP energized, the voltage appearing at the wiper of potentiometer 34 is now applied over the previously traced circuit including lead 44, front contact $g$ of relay RLP, back contact $f$ of relay RHP, lead 46, the grid and cathode of tube V3, lead 116, terminal $c$ of source of signals 10, back contacts $a$, respectively, of relays CLVP and TC, terminal $a$ of source of signals 10, and lead 30 to terminal $a$ of group retarder leaving speed computer 32. The exit speed of the cut from the retarder will therefore be computed from the average value of $R_c$ of cuts in the light weight class, as described in the above-mentioned copending application of Fitzsimmons and Robison Serial No. 676,730.

The operation of the apparatus embodying our invention for a heavy weight cut is believed to be sufficiently clear from the drawings and from the above description for light weight cuts. For instance, when relays CLVP and RHP become energized, potentiometer 36 will be selected and its wiper adjusted an extent determined by the magnitude of the measured value of $R_c$. In addition, when relay CLVP remains deenergized and it becomes necessary to supply an average value of $R_c$, relay RHP becomes energized. The voltage appearing at the wiper of potentiometer 36 will thus be applied to group retarder leaving speed computer 32, for use substantially as described above.

During classification of a cut having a medium weight, and with relay CLVP energized, a circuit is completed from source of signals 10 to group retarder leaving speed computer 32. Accordingly, the measured value of $R_c$ of the corresponding cut is utilized to compute a leaving speed, substantially as described above for cuts of the light and heavy weight class. However, because of the arrangement of contacts $a$ of relays RHP and RLP, the pickup circuit for relay RL1 is now open and this relay therefore remains deenergized. Because of the deenergized condition of relay RL1 it will be appreciated that no adjustment of the average value of $R_c$ of medium weight cuts can be accomplished.

For a medium weight cut, and with relay CLVP deenergized to indicate that the current average value of $R_c$ of medium weight cuts must be used to compute the group retarder leaving speed of the cut, the voltage representing the current average value of $R_c$ of medium weight cuts is now applied to the grid of tube V3 over the previously traced circuit including front contacts $f$ of relays RLP and RHP. The voltage appearing at the cathode of tube V3 is then applied to terminal $a$ of group retarder leaving speed computer 32 over the circuit previously traced for cuts in the light and heavy weight classes.

Referring specifically now to the above equation, it can be seen therefrom that the measured values of $R_c$ of successive cuts must be consistently higher than the selected average value of $R_c$ to cause appreciable difference between the measured and average values and any significant adjustment of the average value. For example, if a number of cuts in the same weight class are successively humped, and if the measured values of $R_c$ of the cuts are consistently either higher or lower than the selected average value of $R_c$ of cuts in that weight class, the average value will be adjusted to agree with the consistently higher or lower measured values of $R_c$. If the measured values of $R_c$ of a group of cuts in the same weight class are of different magnitudes and are randomly distributed above and below the selected average value of $R_c$, no final appreciable change in the average value will result. And, when the measured value of $R_c$ of a light or heavy weight cut is equal to the stored value of $R_c$, no change in the wiper of the selected one of potentiometers 34 and 36 is effected.

Hence an important feature of our invention is the provision that a single light or heavy weight cut whose measured value of $R_c$ is exceptionally higher or lower than the selected average value of $R_c$ will not cause any substantial change in the average value, since, as indicated in the above equation the factor $$\frac{R2}{R1+R2}$$

determines the extent the wiper of the selected potentiometer is adjusted. If it is assumed, for example, that resistor R2 is selected to be much greater than resistor R1, the factor $$\frac{R2}{R1+R2}$$

is approximately unity and the wiper of the selected potentiometer will be adjusted to an extent approximately equal to the full difference between the measured value and the selected average value of $R_c$. For the case in which the brakes of a cut are inadvertently partially applied during the measurement of the rolling resistance of the cut, it can be seen that such partial application of the brakes would be effective to substantially increase the measured value of $R_c$ of the cut over that of a cut having similar rolling characteristics, but not having its movement accidentally partially impeded. With the factor established at unity, the utilization of such an unusually large measured value of $R_c$ to adjust a selected average value would effect a considerable change in the average value. It is thus readily apparent in such a case that the selected average value of $R_c$, when modified in response to the measured value of $R_c$ of a particular cut rolling under such abnormal conditions, is inconsistent with the overall average value of $R_c$ derived from cuts in the same weight class rolling freely down the hump. Subsequent use of the selected average value for an immediately succeeding cut for which a measured value of $R_c$ could not be obtained would be an erroneous indication of the rolling resistance of the succeeding cut.

In contrast to the assumed near unity factor just indicated, if resistor R1 is chosen to be much greater than resistor R2, the factor $$\frac{R2}{R1+R2}$$

would obviously be very small. Consequently, the measured values of $R_c$ of an extremely large number of cuts in the same weight class would be required to cause any appreciable change of the average value of $R_c$ stored in the selected potentiometer. It follows, therefore, that with the factor $$\frac{R2}{R1+R2}$$

being very small, the rate of response of the apparatus embodying my invention, for adjusting the selected average value of $R_c$, would be exceedingly slow.

Statistical and experimental analysis indicate that accurate results are obtained and the above disadvantages overcome with the factor $$\frac{R2}{R1+R2}$$

established at approximately eleven percent. The indicated ratio prevents any single cut from causing a significant change in the setting of the wiper of the selected potentiometer. At the same time, the indicated ratio enables the apparatus embodying our invention to respond at a favorable rate to measured values of $R_c$ of a successive number of cuts. We have found, therefore, that the established factor of eleven percent insures most satisfactory operation of the apparatus embodied herein. However, it is obvious that by changing the magnitude of either resistor R1 or R2 the extent that the wiper of the selected potentiometer is adjusted will accordingly be changed.

By use of potentiometers 34 and 36 disclosed in Fig. 1, and by interconnecting the wipers of these two potentiometers with series-connected impedances so that a voltage having a magnitude derived as a function of the voltages appearing at the two wipers is developed at the junction of the series impedances, we have provided as a particular object of our invention selectable running average values of rolling resistance available for use by cuts in each weight category whenever the cuts fail to qualify as to their lengths or their imposed master retarder leaving speeds. It will be appreciated that by comparing a selected average value of rolling resistance with a measured value of rolling resistance of a particular cut, and by varying the selected average value an extent in part determined by the relative magnitude of the measured value of rolling resistance for that cut, and in part determined by the selection of the ohmic impedances of resistors R1 and R2 comprising the summing network embodied herein, it is possible to supply a group retarder leaving speed computer with an accurate average value of rolling resistance in the event that cut fails to operate in accordance with the preselected conditions imposed on the cut. The advantage and desirability of computing the speed of a particular cut when a measured value of rolling resistance is unavailable, on the basis of an average value of rolling resistance which is periodically adjusted to a new value in response to measured values of rolling resistance separated at most by substantially small time intervals, is readily apparent in that the desired coupling speed of the cut may more readily be attained by utilizing a parameter which is an accurate average representation of the rolling resistance of cuts having preceded the particular cut over the stretch of curved track leading to the group retarder located along the route of the cut. Thus, in the present invention, the available average values of rolling resistance are automatically adjusted, and manual control and seasonal manipulation of the average values of rolling resistance are obviated.

Although we have herein illustrated and described only one form of computing apparatus embodying our invention, it is understood that various changes and modifications may be made therein within the scope of the appended claims without departing from the spirit and scope of our invention.

Having thus described our invention, what we claim is:

1. Apparatus for deriving an average value signal as a function of each of a plurality of measured value signals comprising, in combination, adjustable storage means for storing said average value signal, summing means controlled by said average value signal and said measured value signals for comparing said average value signal and each of said measured value signals and having an output signal proportional to the sum of said average value signal and a discrete percentage of the difference between said average value signal and each of said measured value signals, differential circuit means having connections to said summing means and said storage means for subtracting said average value signal from the summing means output signal to produce a signal in accordance with their difference, and means controlled by said differential circuit means for adjusting said storage means to change said average value signal an extent substantially equal to said difference.

2. In a computer for producing a signal representative of the average value of a plurality of measured value signals whereby the average value signal is modified in response to successive said measured value signals, the combination comprising, storage means for providing an adjustable signal the representative of said average value signal, means responsive to said average value signal and at least one of said measured value signals for supplying signal components proportional to the sum of said average value signal and a predetermined percentage of the difference between the average value signal and said measured value signal, means for supplying an output signal proportional to the difference between a pair of input signals being concurrently responsive to said signal components and to said average value signal, said output signal of said last named means constituting a difference signal comprising the percentage of the difference between the average value signal and said measured value signal, and means controlled by said difference signal supply means for adjusting said average value signal an extent proportional to said difference signal.

3. Computing apparatus for producing a signal representative of the average value of a plurality of measured value signals whereby the average value signal is modified directly as a function of each one of successive said measured value signals, said apparatus comprising storage means for providing an adjustable first signal the current value thereof representing said average value signal, summing means simultaneously responsive to said first signal and each one of said measured value signals for producing a second signal proportional to the sum of said average value signal and a predetermined percentage of the difference between the average value signal and each one of said measured value signals, circuit means concurrently responsive to said first and second signals for comparing said signals and producing a difference signal in accordance only with the percentage of the difference between the average value signal and each one of said measured value signals, means operatively connected to said storage means for adjusting said first signal, and means controlled by said comparing circuit means for completing a circuit for said signal adjusting means to produce an average value signal adjusted an amount substantially proportional to said difference signal.

4. In a computer system, in combination, a device having an adjustable first signal the representative of a running average value of a plurality of measured value signals, positioning means operatively connected to said device for adjusting said first signal, a summing circuit for producing a second signal proportional to the sum of a pair of input signals applied thereto, a source of said measured value signals, means for connecting said source to said summing network to successively apply said measured value signals to said summing network, circuit means connecting said summing network to said device coincident to the application of said measured value signals to said summing network, said second signal comprising the sum of the average value signal and a discrete percentage of the difference between said average value signal and successive said measured value signals, a storage unit coupled to said summing circuit and having an output signal modified in proportion to the value of said second signal, a differential circuit arrangement having first and second input terminals for producing a control signal substantially proportional to the difference of input signals applied to the respective input terminals thereof, means for terminating the modification of said storage unit by said second signal and for concurrently connecting respectively said first and second input terminals of said differential circuit arrangement to said storage unit and said device, said control signal of said differential circuit arrangement comprising only said discrete percentage of the difference between said average value signal and successive said measured value signals, and means controlled by said differential circuit arrangement for energizing said positioning means to adjust said first signal an extent substantially equal to said control signal.

5. In a railway classification yard including a system for producing a plurality of measured value signals proportional to the rolling resistance of cuts of railway cars traversing a stretch of track in said yard, and apparatus for deriving a signal reprsentative of an average value of available ones of said measured value signals for use of the average value signal when a measured value signal of a particular cut of cars is not available, said apparatus comprising, in combination, a potentiometer comprising a resistive element having a wiper adjustable thereon, means for applying a fixed voltage across said resistive element thereby producing a voltage at said wiper, the wiper voltage corresponding at all times to a current average value signal, first and second impedance elements, one end of said first impedance element being connected to one end of said second impedance element to form series-connected impedances, circuit means for connecting said wiper to the other end of said first impedance element, a source of said measured value signals, means effective when a measured value signal of a particular cut of cars is available for connecting said source to the other end of said second impedance element, said first and second impedance elements each having a preselected ohmic impedance so that the signal appearing at the junction connecting their one ends is proportional to the sum of the current average value signal and a predetermined percentage of the difference between said current average value signal and said measured value signal, and a differential circuit arrangement connecting said wiper and the interconnection of said impedance elements for producing a control signal proportional only to the percentage of the difference between the current average signal and said measured value signal, and motor means drivably connected to said wiper for adjusting said wiper voltage, said differential circuit arrangement further having connections for energizing said motor means to control the adjustment of said wiper an extent substantially equal to said control signal.

6. Apparatus of the class described for producing a final average value signal from a plurality of measured value signals, said apparatus comprising, in combination, a potentiometer comprising a resistive element having a wiper adjustable thereon, means for applying a fixed voltage across said resistive element thereby producing a voltage at said wiper, the wiper voltage representing a first average value signal; a source of said measured value signals, summing means having a pair of input terminals and an output terminal, first control means being normally deenergized and effective when energized for connecting said source to a first input terminal of said summing means to apply thereto at least one of said measured value signals, and means connecting said wiper to a second input terminal of said summing means coincident with the application of said measured value signal to the first input terminal of said summing means, said summing means producing at its output terminal an output signal substantially equal to the sum of said first average value signal and a predetermined percentage of the difference between the first average value signal and said measured value signal, storage means for storing the output signal of said summing means connected to the output terminal of said summing means, second control means, an energizing circuit for said second control means including a closed front contact of said first control means, and a differential circuit arrangement connecting said storage means and said wiper when said second control means is energized for producing a control signal proportional to the percentage of the difference between the first average signal and said measured signal, and motor means drivably connected to said wiper for adjusting said wiper voltage, said differential circuit arrangement further having connections for energizing said motor means to control the adjustment of said wiper an extent substantially equal to said control signal.

7. In a control system for a railway classification yard, means for producing a measured value signal representative of the rolling resistance of a cut of railway cars moving over a stretch of track in said yard, means for determining the position of a particular cut of cars at a predetermined location on said track to indicate the attainment of a final measured value signal of rolling resistance of said particular cut of cars, and apparatus for computing a signal which corresponds to an average value of successive said measured value signals, said apparatus comprising, in combination; a potentiometer comprising a resistive element having a wiper adjustable thereon, means for applying a fixed voltage across said resistive element whereby the voltage appearing at said wiper represents an average value signal of rolling resistance of cuts of cars derived in accordance with measured value signals of rolling resistance of cuts of cars having preceded said particular cut of cars over said stretch of track, summing means for producing a composite signal proportional to the sum of input signals, means for connecting said measured value signal producing means to said summing means to apply to said summing means a measured value signal, means for connecting said wiper to said summing means coincident with the application of said measured value signal to said summing means, said composite signal of said summing means comprising the sum of said average value signal and a discrete percentage of the difference between the average and measured value signals, a storage unit connected to said summing means in such manner that said storage means is modified by said composite signal, a differential amplifier adapted to produce a control signal proportional to the difference between a pair of input signals applied thereto, means for terminating further modification of said storage means by said composite signal upon attainment of said final measured value signal, said last named means further concurrently connecting said differential amplifier to said wiper and said storage means, a differential relay having connections to said differential amplifier in such manner to be energized in response to said control signal, motor means drivably connected to said wiper, and a circuit including means controlled by said differential relay for energizing said motor means to control the adjustment of said wiper an extent substantially equal to said control signal.

8. In computing apparatus, a summing circuit having input terminals adapted for respective connection to a first source having a plurality of measured value signals and to a second source having an adjustable signal component representative of the current value of an average value signal derived as a direct function of successive ones of said measured value signals, said summing circuit being arranged to produce in response to coincident application thereto of said average value signal and each of said measured value signals a composite signal consisting of the sum of the current value of said average value signal and a predetermined percentage of the difference between the current value of said average value signal and each of said measured value signals, differential circuit means adapted for concurrent reception of said composite signal and the current value of said average value signal and producing in accordance with said pair of signals a difference signal substantially proportional to said predetermined percentage of the difference between the current value of said average value signal and each of said measured value signals, positioning means operatively connected to said second source for adjusting said average value signal, and means actuated in response to said difference signal for completing a circuit for said positioning means to effect an increase or decrease of said average value signal an extent substantially proportional to said difference signal according as respective ones of said measured value signals are greater or less than the initial current value of said average value signal.

9. In a control system in a railway classification yard, means for continuously supplying measured value signals each the representative of the rolling resistance of a particular cut of railway cars traversing a stretch of track in said yard and measured as said particular cut of cars occupies a first predetermined section of said track, means for determining the instant said particular cut of cars occupies a second predetermined section of said track, and circuit means for producing a signal representing a final average value of the measured value signals of successive ones of said cuts of cars as a function of the measured value signal available at the instant said second predetermined section of track becomes occupied, said circuit means comprising in combination, a potentiometer comprising a resistive element having a wiper adjustable thereon, means for applying a fixed voltage across said resistive element thereby producing at said wiper a voltage having an instant value corresponding to the current value of the average value signal, a summing circuit for producing a composite signal proportional to the sum of a pair of input signals applied thereto, means for connecting said summing circuit to said measured value signal supplying means thereby continuously applying to said summing circuit said measured value signals, circuit means for connecting said wiper to said summing circuit substantially coincident with the application to said summing circuit of successive ones of said measured value signals, said summing means producing signal components proportional to the sum of the average value signal and a discrete percentage of the difference between said average value signal and successive ones of said measured value signals, storage means coupled to said summing means for storing said signal components and having an output signal modified by said signal components, a differential circuit arrangement for producing a control signal proportional to the difference between a pair of input signals applied thereto, means for terminating further modification of said storage means by said signal components upon attainment of the final measured value signal, means controlled by said last named means for concurrently connecting said differential circuit arrangement to said wiper and to said storage means, said differential circuit arrangement producing a control signal having a value substantially proportional to the percentage of the difference between said average value signal and the final measured value signal, motor means drivably connected to said wiper for adjusting the voltage appearing at said wiper, and an energizing circuit for said motor means including means controlled by said differential circuit arrangement whereby said motor means is ineffective when energized to adjust said wiper an extent substantially equal to the value of said control signal.

10. In a control system in a railway classification yard in which cuts of railway cars proceeding toward an assigned storage track traverse a stretch of curved track, computer means for supplying a plurality of measured value signals each the representative of the computed rolling resistance of said cuts while traversing said stretch, means for determining when a particular cut of cars occupies a predetermined location on said stretch of track to indicate the attainment of a final measured value signal of rolling resistance of said particular cut of cars, and circuit means for computing a running average value signal of said measured value signals, said circuit means comprising, in combination; a plurality of potentiometers each comprising a resistive element having a wiper adjustable thereon, means for applying a fixed voltage across said resistive elements, the voltage then appearing at each of said wipers representing an average value signal of the measured value signals of rolling resistance of cuts of cars having axle loading falling within predetermined weight limits, positioning means drivably connected to said wipers for adjusting the voltages appearing at said wipers, weight repeater relays energized in combination in accordance with the axle loading of each cut, summing means for producing a composite signal proportional to the sum of input signals applied thereto, a first relay, an energizing circuit for said first relay when said computer means supplies a measured value signal, means controlled by said first relay in the energized condition thereof for completing a circuit to apply said measured value signal to said summing means, means controlled by said weight repeater relays for selecting one of said potentiometers to connect its wiper to said summing means and thereby apply to said summing means an average value signal, the composite signal of said summing means comprising the sum of said average value signal and a discrete percentage of the difference between said average value signal and said measured value signal, a second relay, an energizing circuit for said second relay when a final measured value signal of rolling resistance of said particular cut is attained including a closed front contact of said first relay, storage means, circuit means including a back contact of said second relay for applying said composite signal to said storage means to thereby modify said storage means in accordance with the composite signal prior to the attainment of said final measured value signal, a differential circuit arrangement adapted to produce a control signal substantially proportional to the difference of two input signals applied thereto, means including closed front contacts of said second relay for respectively connecting said differential circuit arrangement to said wiper of the selected potentiometer and to said storage means, said control signal having a value proportional to the percentage of the difference between said average value signal and said final measured value signal, and a circuit for energizing said positioning means including contacts of said weight repeater relays and further including means controlled by said differential circuit arrangement, said positioning means being operable when energized to increase or decrease the voltage appearing at the wiper of said selected potentiometer an extent substantially equal to the value of said control signal according as said final measured value signal is greater or less than the average value signal initially available at the wiper of said selected potentiometer.

11. Apparatus of the class described for use in a control system in a railway classification yard and arranged for receiving measured value signals representing the computed rolling resistance of cuts of railway cars, said apparatus operable in response to said measured value signals to produce a plurality of variable average value signals each of which represents the average of measured value signals computed from cuts included in one of a plurality of weight categories, said apparatus comprising, in combination, first and second potentiometers each comprising a resistive element having a wiper adjustable thereon, means for applying a fixed voltage across said resistive elements thereby producing a voltage at each of said wipers, at least two impedance elements arranged in series connection forming a terminal therebetween and interconnecting said wipers, the wiper voltage of said first potentiometer, the wiper voltage of said second potentiometer, and the voltage appearing at said terminal representing respectively average value signals of rolling resistance of cuts having axle loadings designated light, heavy, and medium, positioning means drivably connected to said wipers for adjusting said wiper voltages, weight repeater relays energized in combination in accordance with the axle loading of said cuts of cars, a summing circuit, means controlled by said weight repeater relays for selecting an average value signal from said wipers according as the axle loading of a particular cut of cars is light or heavy and applying said signal to said summing circuit, means for applying to said summing circuit a measured value signal of rolling resistance of said particular cut substantially coincident to the application to said summing circuit of said selected average value signal, said summing circuit being arranged in such manner to produce a composite signal proportional to the sum of said selected average value signal and a discrete percentage of the difference between the selected average value signal and said measured value signal, differential circuit means operated in response to said composite signal and said selected average value signal for comparing said signals and producing a difference signal proportional to the percentage of the difference between the selected average value signal and said measured value signal, and means controlled by said differential circuit means and said weight repeater relays for completing a circuit to actuate the positioning means associated with the wiper of said selected potentiometer, whereby said positioning means is effective when actuated to correct the voltage appearing at said wiper an extent proportional to said difference signal and accordingly adjust said selected average value signal.

12. A rolling resistance computer adapted for use in a railway classification yard for providing selectable signals each of which represents the average of a plurality of measured signals, said measured signals each corresponding to the rolling resistance of a cut of railway cars traversing a stretch of curved track in said yard and having axle loading within predetermined weight limits, said computer comprising, in combination, first and second potentiometers each comprising a resistive element having a wiper adjustable thereon, a fixed voltage impressed across said resistive elements, the voltage then appearing at said wipers of said first and second potentiometers representing respectively average signals of rolling resistance of cuts of cars traversing said stretch having light and heavy axle loading, and at least two resistive elements in series connection having an intermediate terminal therebetween and interconnecting the wipers of said first and second potentiometers, whereby the voltage appearing at said intermediate terminal corresponds to the average value of rolling resistance of cuts of cars traversing said stretch having axle loading designated medium.

13. Apparatus for producing an average value of rolling resistance of medium weight cuts of railway cars as a function of the rolling resistance of light weight and heavy weight cuts of cars, comprising, in combination, a first potentiometer having a variable output voltage representative of an average value of rolling resistance of said light weight cuts of cars, a second potentiometer having a variable output voltage representative of an average value of rolling resistance of said heavy weight cuts of cars, and an impedance electrically divided into two parts by an intermediate terminal for interconnecting the wipers of said first and second potentiometers, whereby the voltage appearing at said intermediate terminal represents a variable average value of rolling resistance of medium weight cuts of cars.

No references cited.